(12) United States Patent
Oya et al.

(10) Patent No.: US 7,943,866 B2
(45) Date of Patent: May 17, 2011

(54) HOUSING

(75) Inventors: Makoto Oya, Sumida-ku (JP); Jun Matsui, Tohkai (JP)

(73) Assignee: Buffalo Inc., Nagoya (JP)

( * ) Notice: Subject to any disclaimer, the term of this patent is extended or adjusted under 35 U.S.C. 154(b) by 266 days.

(21) Appl. No.: 12/396,801

(22) Filed: Mar. 3, 2009

(65) Prior Publication Data

US 2009/0230127 A1   Sep. 17, 2009

(30) Foreign Application Priority Data

Mar. 3, 2008   (JP) .................................. 2008-052690

(51) Int. Cl.
*H05K 7/02* (2006.01)

(52) U.S. Cl. ............ 174/541; 174/545; 174/60; 174/135

(58) Field of Classification Search ................... 174/541, 174/545, 60, 135
See application file for complete search history.

(56) References Cited

U.S. PATENT DOCUMENTS

| 3,119,978 | A  | * | 1/1964 | Sears ............................. 367/188 |
| 5,006,960 | A  | * | 4/1991 | Kallin et al. ................... 361/724 |
| 5,241,136 | A  | * | 8/1993 | Michaelis et al. ............ 174/151 |
| 6,365,831 | B1 | * | 4/2002 | Rupp et al. ....................... 174/50 |
| 6,870,095 | B1 | * | 3/2005 | Whitted ........................ 174/481 |
| 2006/0021789 | A1 | * | 2/2006 | Nishikino et al. ............. 174/135 |
| 2009/0090550 | A1 | * | 4/2009 | Bird ............................. 174/500 |

FOREIGN PATENT DOCUMENTS

JP   9-55590   2/1997

* cited by examiner

*Primary Examiner* — Hung V Ngo
(74) *Attorney, Agent, or Firm* — Oblon, Spivak, McClelland, Maier & Neustadt, L.L.P.

(57) ABSTRACT

A housing of the present invention can house an electronic device therein and is provided with a cable housing capable of housing a part of a cable. The cable housing is formed of a depression and a protrusion extending out from a part of a first sidewall of the depression toward a fourth sidewall of the depression along a second sidewall, a third sidewall, and a bottom wall of the depression. At a boundary portion between a housing area and a passing area, a distance between the second sidewall and the third sidewall in the housing area is longer than a distance between the second sidewall and the third sidewall in the passing area.

5 Claims, 9 Drawing Sheets

US 7,943,866 B2

HOUSING

CROSS REFERENCE TO RELATED APPLICATION

This application is based upon and claims the benefit of priority from the prior Japanese Patent Application No. P2008-052690, filed on Mar. 3, 2008; the entire contents of which are incorporated herein by reference.

BACKGROUND OF THE INVENTION

1. Field of the Invention

The present invention relates to a housing that can house an electronic device therein and that is provided with a cable housing capable of housing a part of a cable.

2. Related Art

In a housing that can house an electronic device therein, a structure that a hook for hooking a cable such as a power cable provided on a rear surface of the housing is known as a conventional structure to store a cable therein.

The structure described above, however, has an appearance problem that outside dimensions of the housing becomes large since the hook extends outwards from the housing.

In addition, in the above structure, the hook has to be strong against bending so as not to be broken while in use. This causes another problem that members constituting the hook have to be made large.

SUMMARY OF THE INVENTION

Hence, the present invention has been made in light of the aforementioned problems. An object of the present invention is to provide a housing that can house a part of a cable and can prevent a part of the cable from falling off, without increasing the outside dimension.

One aspect of the present invention is a housing that can house an electronic device therein. The housing includes a cable housing capable of housing a part of a cable. The cable housing includes a depression and a protrusion extending out from a part of a first sidewall of the depression towards a fourth sidewall of the depression along a second sidewall, a third sidewall, and a bottom wall of the depression. In the cable housing, a part of the cable is housed in a housing area by way of a passing area after being inserted into an insertion area. The housing area and the passing area each include a space between the protrusion and the second sidewall, a space between the protrusion and the third sidewall, and a space between the protrusion and the bottom wall. The insertion area includes a space between the protrusion and the fourth sidewall. Moreover, at a boundary portion between the housing area and the passing area, a distance between the second sidewall and the third sidewall in the housing area is longer than a distance between the second sidewall and the third sidewall in the passing area.

In the above aspect of the present invention, an insertion port into which an end of the cable is inserted can be provided.

Another aspect of the present invention is a housing that can house an electronic device therein. The housing includes a cable housing capable of housing a part of a cable. The cable housing is formed within the housing, and is formed of: a cable housing space capable of housing the part of the cable; and an opening which opens to outside of the housing from the cable housing space, and includes: an upper opening section and a lower opening section which are formed in a substantially horizontal direction; and an intermediate opening section formed from one lateral end of the upper opening section to the same lateral end of the lower opening section, wherein an upper edge of other lateral end of the upper opening section has a convex shape that is convexed upwards, and a lower edge of other lateral end of the lower opening section has a convex shape that is convexed downwards.

In another aspect of the present invention, an insertion port into which an end of the cable is inserted can be provided.

Another aspect of the present invention is a cable housing capable of housing a part of a cable which is connectable to electronic device housed in a housing, the cable housing formed within the housing; the cable housing comprising: a cable housing space capable of housing the part of the cable; an opening which opens to outside of the housing from the cable housing space, and the opening including: an upper opening section and a lower opening section which are formed in a substantially horizontal direction; and an intermediate opening section formed from one lateral end of the upper opening section to the same lateral end of the lower opening section, wherein an upper edge of other lateral end of the upper opening section has a convex shape that is convexed upwards, and a lower edge of other lateral end of the lower opening section has a convex shape that is convexed downwards, whereby when the part of the cable is housed in the cable housing, the part of the cable is forced against walls of the convex in both the upper opening section and the lower opening section by restoring force of the cable.

As described above, according to the present invention, it is possible to provide a housing that can house a part of a cable and can prevent the part of the cable from falling off, without increasing an outside dimension.

DETAILED DESCRIPTION OF THE INVENTION

Housing According to a First Embodiment of the Present Invention

A housing 50 according to the first embodiment will be described with reference to FIGS. 1 to 5.

Figure 1:
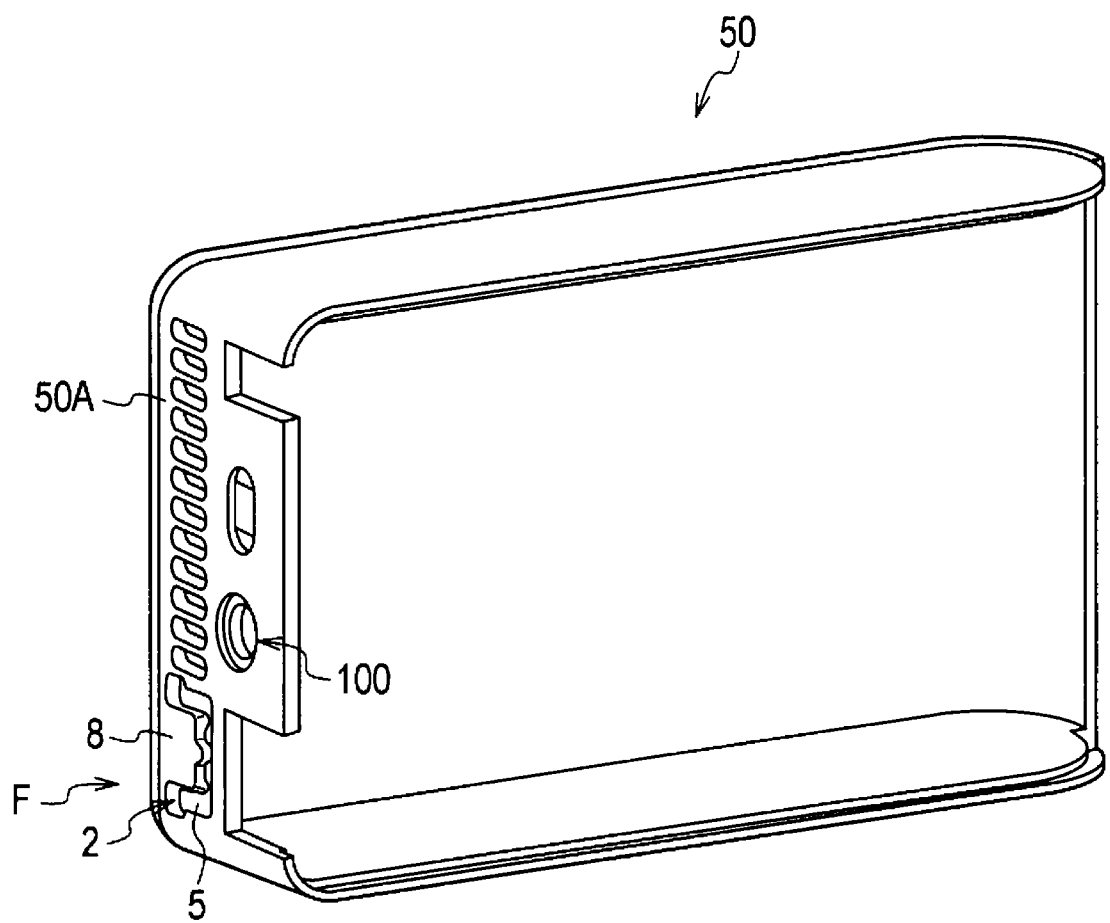
FIG. 1 is a rear perspective view of a housing according to a first embodiment of the present invention.

The housing 50 according to the embodiment is a housing that can house an electronic device therein. FIG. 1 shows a rear perspective view of the housing 50.

Figure 2:
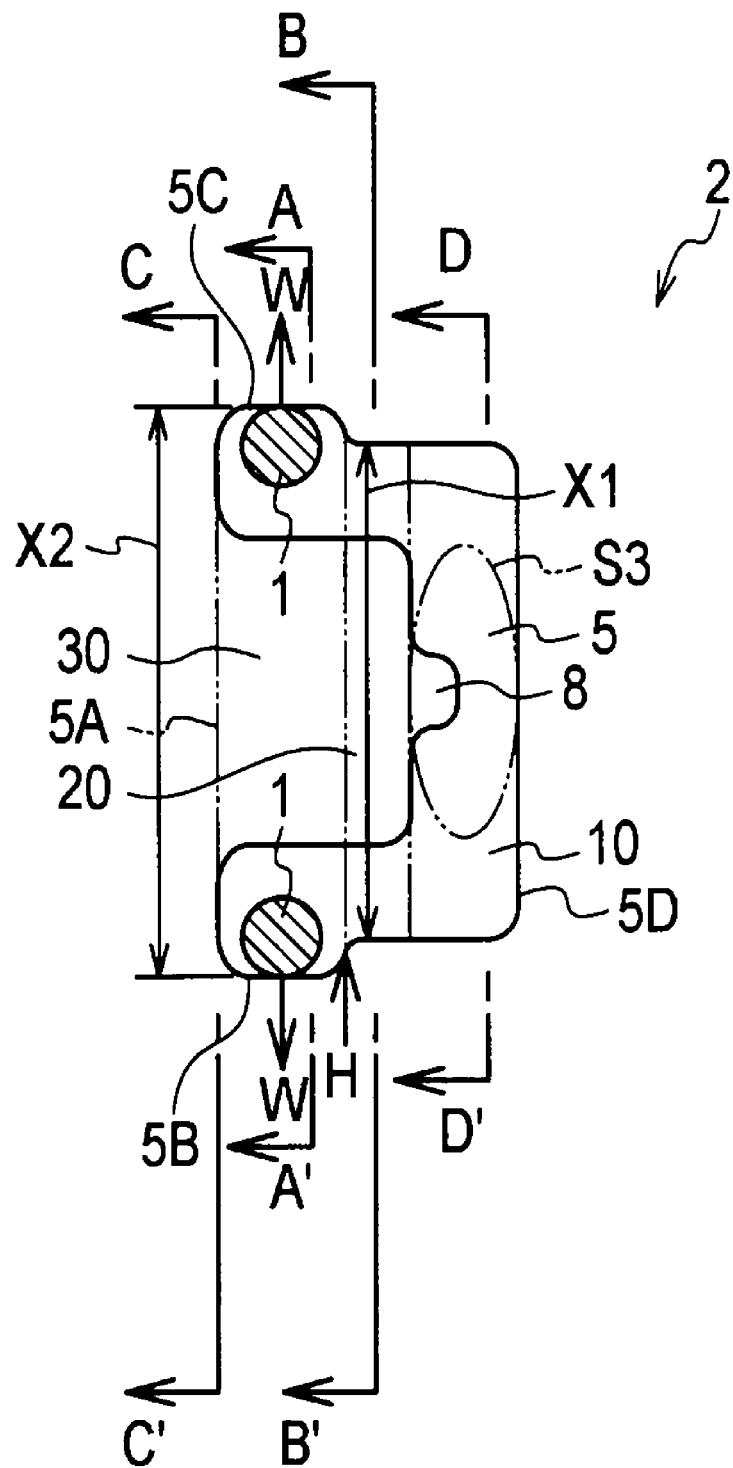
FIG. 2 is a rear view of a cable housing provided in the housing according to the first embodiment of the present invention.

As shown in FIGS. 1 and 2, a cable housing 2 capable of housing a part of a cable 1, such as a power cable or a communication cable, is provided in one sidewall (rear, for example) 50A.

In addition, an insertion port 100 into which an end of the cable 1 is inserted is provided on the one sidewall 50A of the housing 50 according to the embodiment.

The cable housing 2 will be described below with reference to FIGS. 2 to 6. FIG. 2 is a view, viewed from the direction F in FIG. 1, of the cable housing 2 provided in the one sidewall 50A of the housing 50 according to the embodiment.

Figure 3:
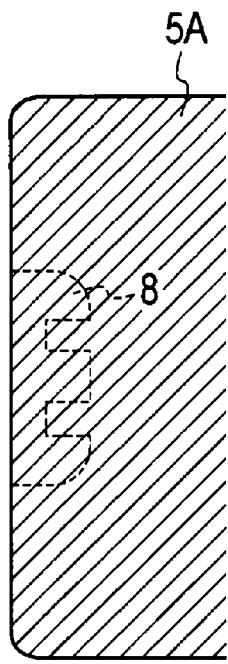
FIG. 3 is a cross-sectional view, taken along the line C-C', of the cable housing provided in the housing according to the first embodiment of the present invention.
Figure 4:
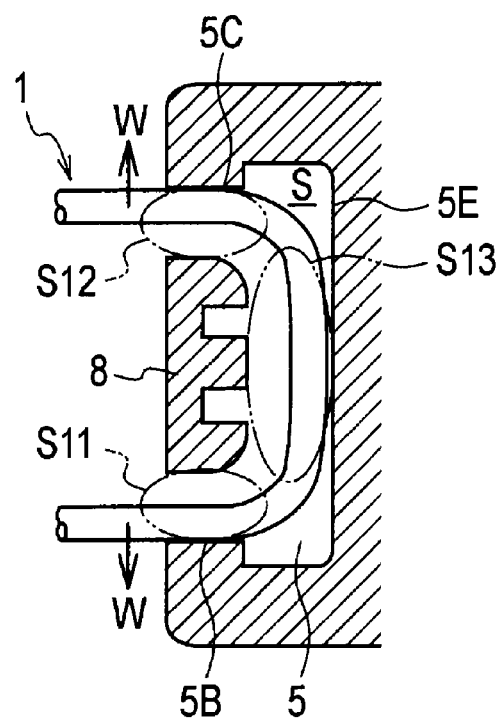
FIG. 4 is a cross-sectional view, taken along the line A-A', of the cable housing provided in the housing according to the first embodiment of the present invention.
Figure 5:
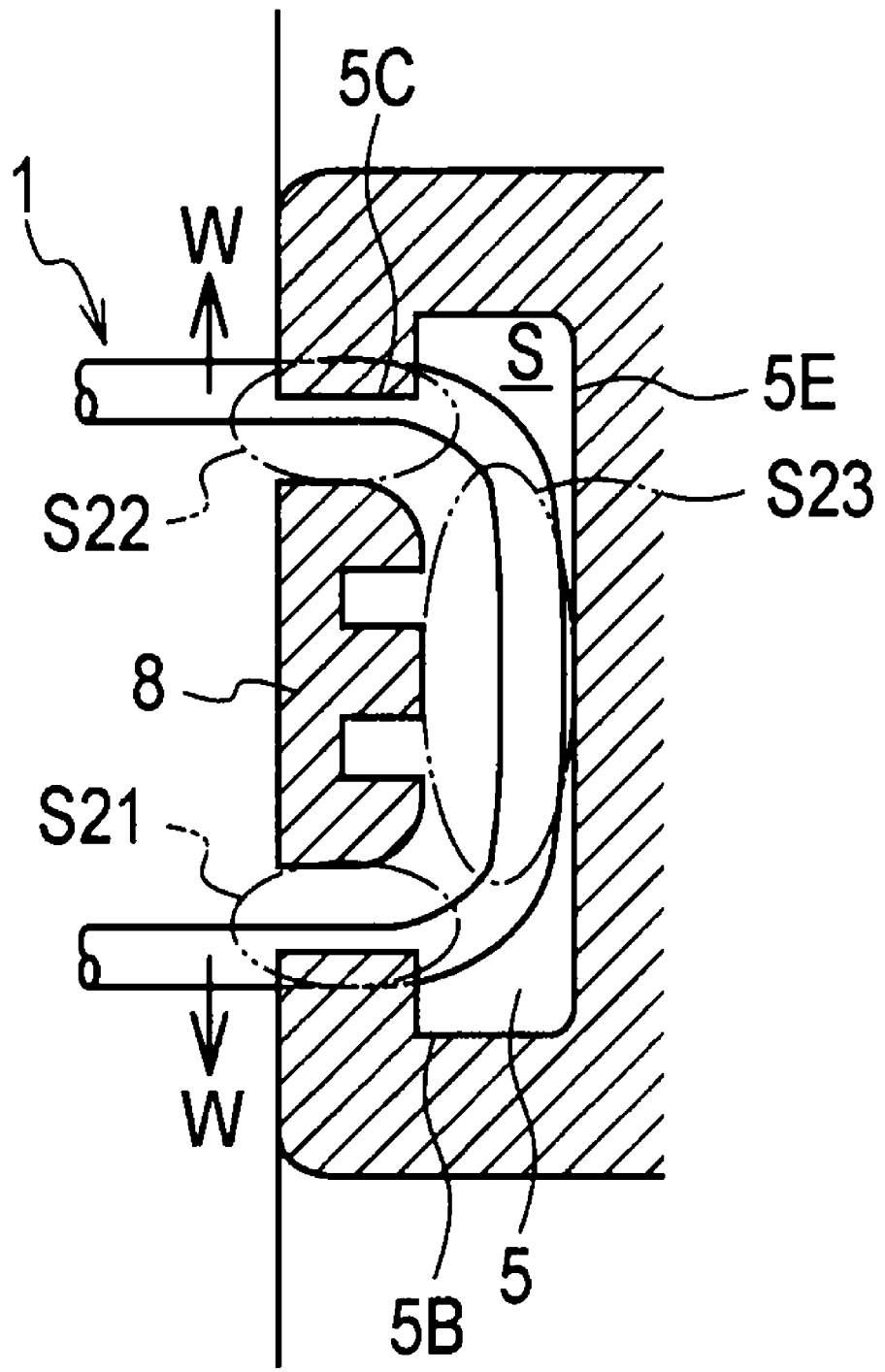
FIG. 5 is a cross-sectional view, taken along the line B-B', of the cable housing provided in the housing according to the first embodiment of the present invention.
Figure 6:
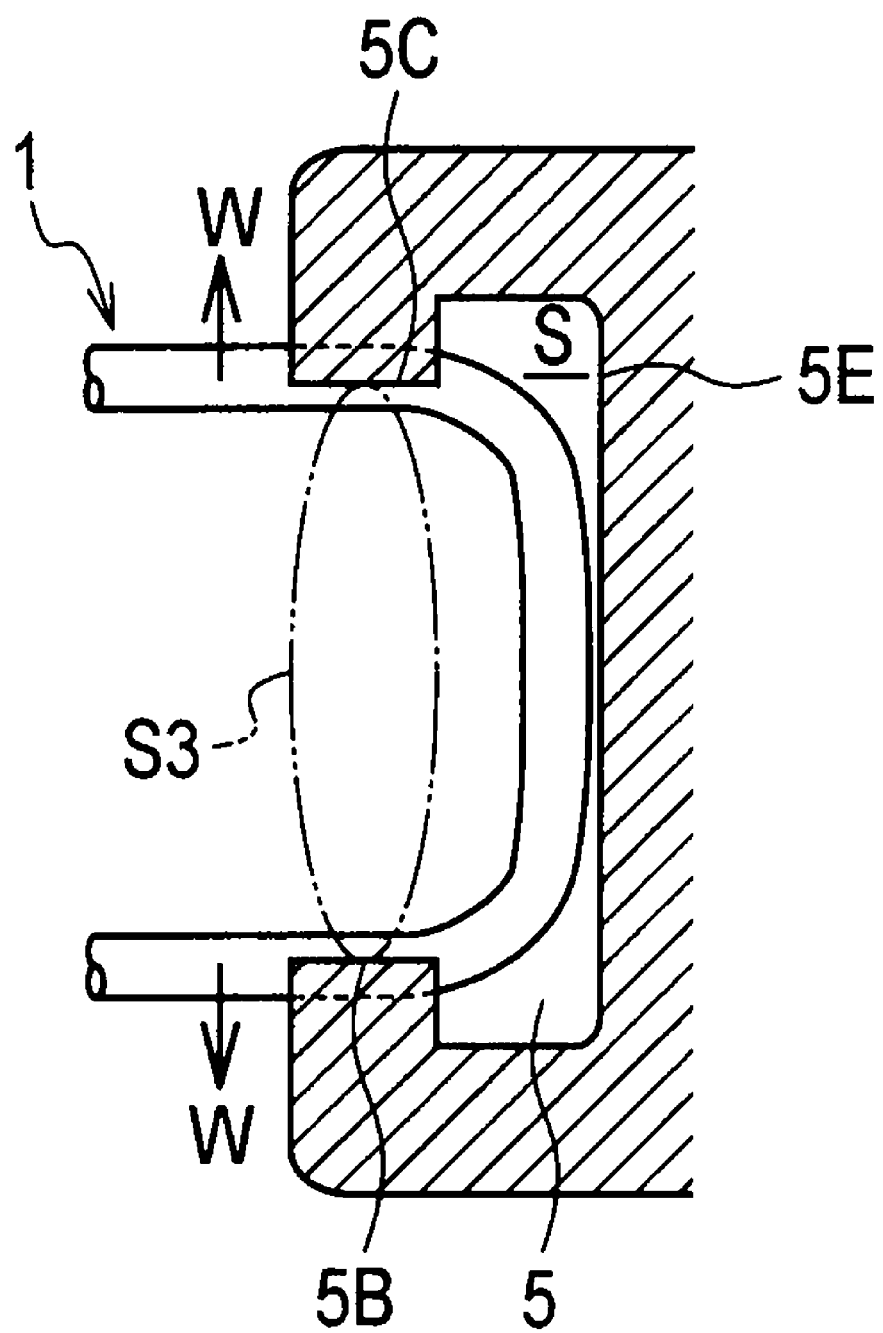
FIG. 6 is a cross-sectional view, taken along the line D-D', of the cable housing provided in the housing according to the first embodiment of the present invention.

Additionally, FIG. 3 is a cross-sectional view (cross-sectional view taken along the line C-C') of a first sidewall 5A of a depression 5 constituting the cable housing 2 in FIG. 2. FIG. 4 is a cross-sectional view (cross-sectional view taken along the line A-A') of a housing area 30 of the cable housing 2 in FIG. 2. FIG. 5 is a cross-sectional view (cross-sectional view taken along the line B-B') of a passing area 20 of the cable housing 2 in FIG. 2. FIG. 6 is a cross-sectional view (cross-sectional view taken along the line D-D') of a fourth sidewall 5D of the depression 5 constituting the cable housing 2 in FIG. 2.

As shown in FIG. 2, the cable housing 2 is formed of the depression 5 and a protrusion 8. The depression 5 is depressed inwards into the housing 50 and, when viewed from the front, has a substantially rectangular-shaped opening if the protrusion is excluded. When the depression 5 is viewed from the front, the protrusion 8 extends out into the depression 5 from a part of the outer circumference of the depression 5.

Specifically, as shown in FIGS. 2 to 6, the protrusion 8 extends out towards the fourth sidewall 5D from in a part of the first sidewall 5A of the depression 5 along a second sidewall 5B, a third sidewall 5C, and a bottom wall 5E of the depression 5.

In the embodiment, when the depression 5 is viewed from the front, the first sidewall 5A forms a left side surface of the depression 5, the fourth sidewall 5D forms a right side surface of the depression 5, the third sidewall 5C forms an upper side surface of the depression 5, and the second sidewall 5B forms a lower side surface of the depression 5. In other words, the first sidewall 5A and the fourth sidewall 5D are opposed to each other, and the third sidewall 5C and the second sidewall 5B are opposed to each other.

Note that the protrusion 8 is not limited to a shape extending out to the right side surface from a part of the left side surface of the depression 5. Alternatively, the protrusion 8 may be a shape extending out to the left side surface from a part of the right side surface of the depression 5, a shape extending out to the lower side surface from a part of the upper side surface of the depression 5, or a shape extending out to the upper side surface from a part of the lower side surface of the depression 5.

In addition, the cable housing 2 has an insertion area 10, the passing area 20, and the housing area 30.

In the cable housing 2, to be housed in the housing area 30, a part of the cable (not including both ends thereof) is inserted into the insertion area 10 and then passes through the passing area 20.

Specifically, as shown in FIG. 4, the housing area 30 includes a space S11 between the protrusion 8 and the second sidewall 5B, a space S12 between the protrusion 8 and the third sidewall 5C, and a space S13 between the protrusion 8 and the bottom wall 5E.

Similarly, as shown in FIG. 5, the passing area 20 includes a space S21 between the protrusion 8 and the second sidewall 5B, a space S22 between the protrusion 8 and the third sidewall 5C, and a space S23 between the protrusion 8 and the bottom wall 5E.

In addition, as shown in FIGS. 2 and 6, the insertion area 10 includes a space S3 between the protrusion 8 and the fourth sidewall 5D.

Furthermore, as shown in FIG. 2, it is so designed that, in a boundary portion H between the housing area 30 and the passing area 20, a distance X2 between the second sidewall 5B and the third sidewall 5C in the housing area 30 is longer than a distance X1 between the second sidewall 5B and the third sidewall 5C in the passing area 20.

Restoring force is given in arrow direction W to a part of the cable housed in the housing area 30. Therefore, force greater than the restoring force has to be given to the part of the cable 1 in a direction opposite to the arrow W, in order to move the part of the cable 1 to the direction of the passing area 20, beyond a step existing at a boundary part H of the housing area 30 and the passing area 20.

Thus, the part of the cable 1 can be kept housed in a stable condition in the housing area 30. In other words, it is possible to prevent the part of the cable 1 from falling off from the housing area 30.

Next, the operation of housing the power cable 1 into the housing 50 according to the embodiment will be described with reference to FIGS. 7 to 10.

Figure 7:
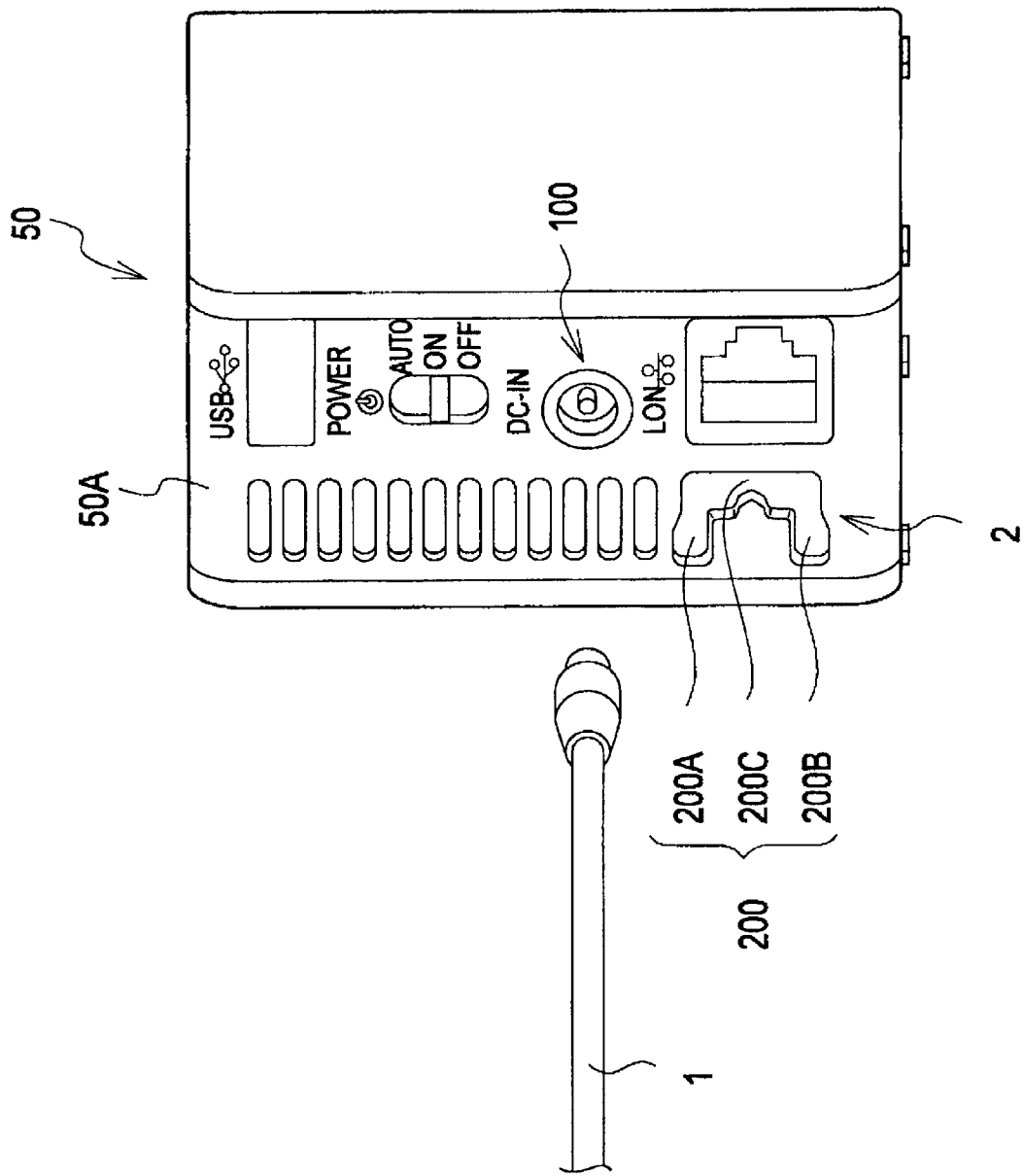
FIG. 7 is a view for describing how a cable is housed in the cable housing provided in the housing according to the first embodiment of the present invention.

Firstly, as shown in FIG. 7, a user inserts an end of the power cable 1 into the insertion port 100 provided on the rear 50A of the housing 50, and connects a connector provided at the end of the power cable 1 to a power supply unit of an electronic device housed within the housing 50.

Figure 8:
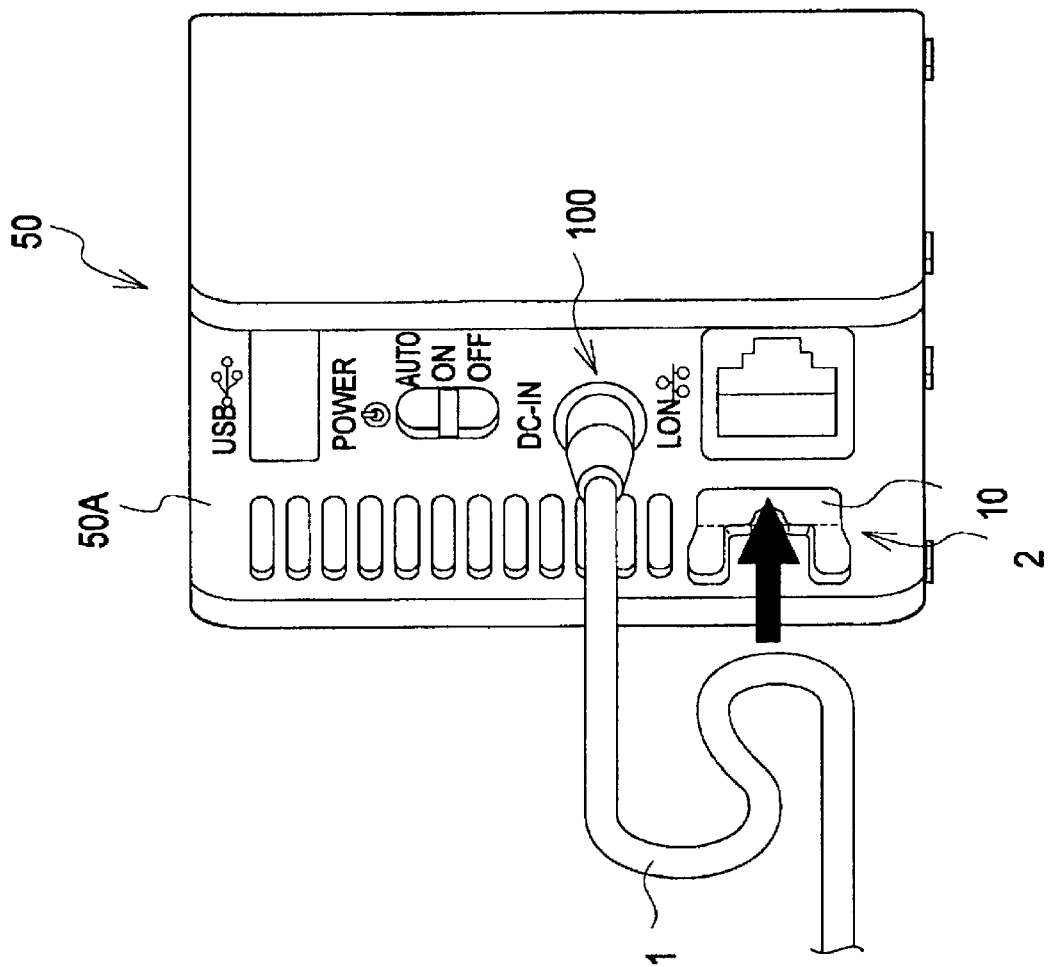
FIG. 8 is a view for describing how the cable is housed in the cable housing provided in the housing according to the first embodiment of the present invention.

Secondly, as shown in FIG. 8, the user inserts a part of the power cable 1, which does not include both ends and is bent like an arch, into the insertion area 10 (opening in the cable housing 2) in the cable housing 2.

Figure 9:
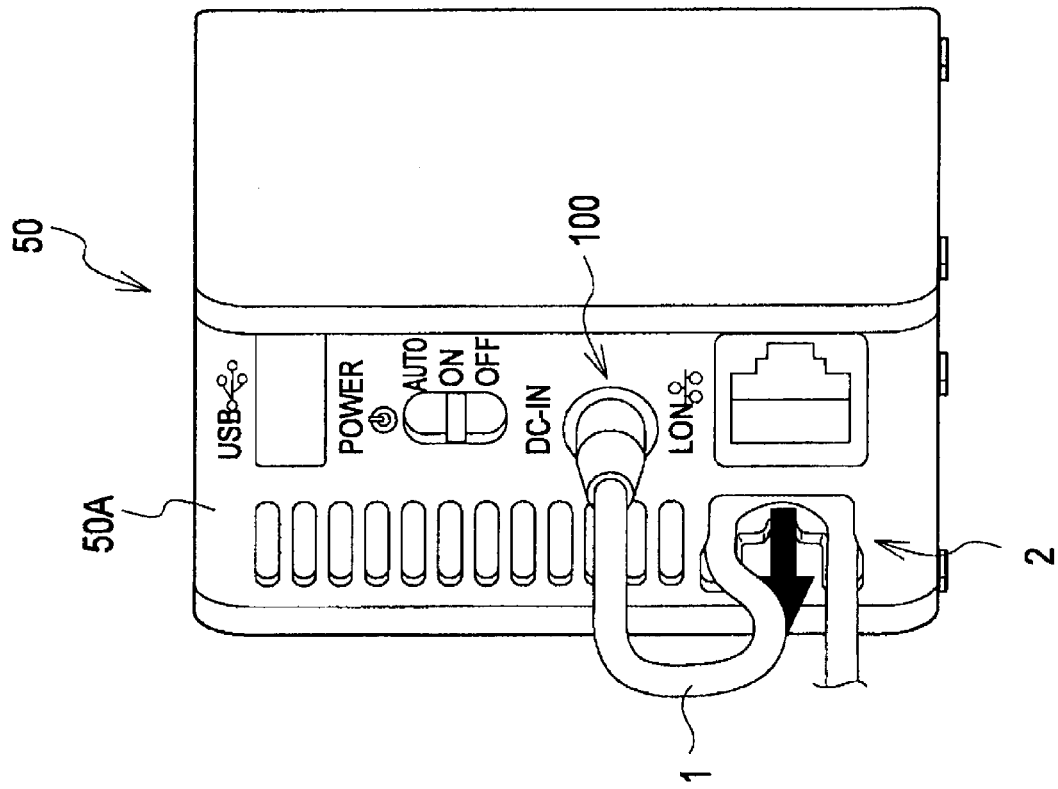
FIG. 9 is a view for describing how the cable is housed in the cable housing provided in the housing according to the first embodiment of the present invention.

Thirdly, as shown in FIG. 9, the user moves (slides) the part of the cable 1, which the user inserted into the insertion area 1 and is bent like an arch, to the left direction towards the rear 50A of the housing 50 (i.e., towards the first sidewall 5A).

Figure 10:
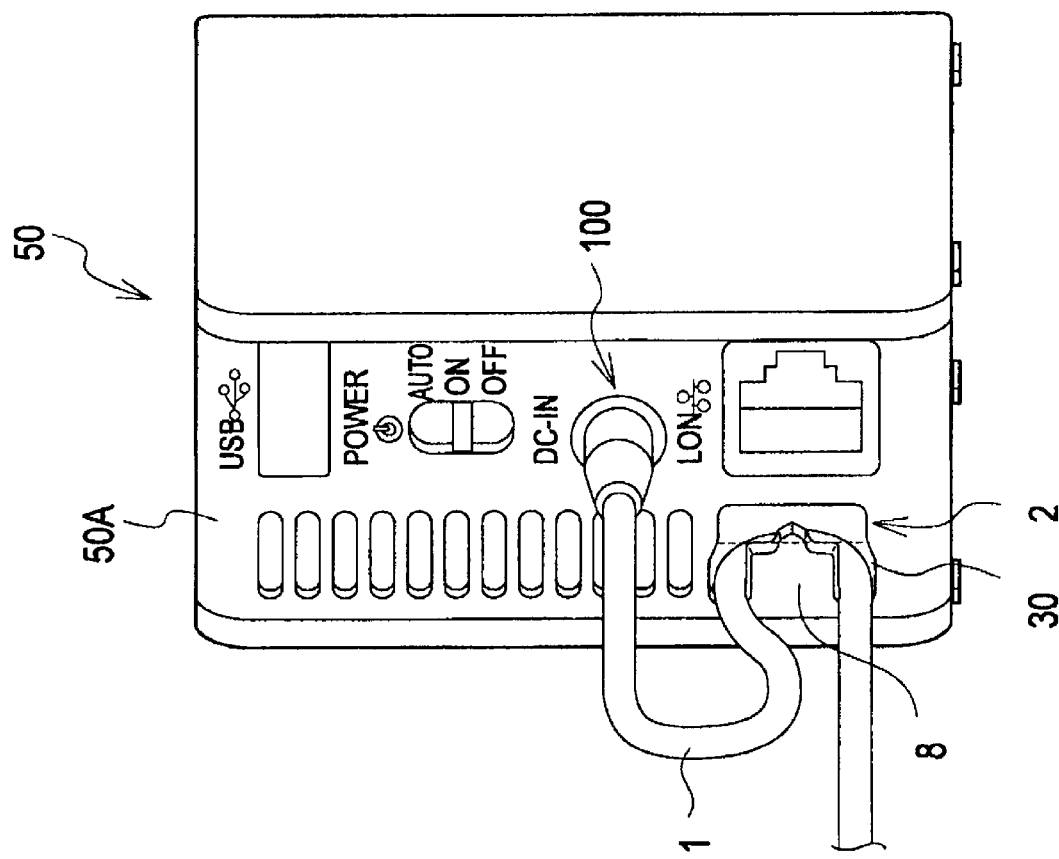
FIG. 10 is a view for describing how the cable is housed in the cable housing provided in the housing according to the first embodiment of the present invention.

Fourthly, as shown in FIG. 10, the user houses the part of the cable 1, which the user inserted into the insertion area 10 and is bent like the arch, into the housing area 30.

Here, the part of the cable 1 reaches the housing area 30 containing the space S11 between the protrusion 8 and the second sidewall 5B of the depression 5, the space S12 between the protrusion 8 and the third sidewall 5C of the depression 5, and the space S13 between the protrusion 8 and the bottom wall 5E of the depression 5, through the passing area 20 containing the space S21 between the protrusion 8 and the second sidewall 5B of the depression 5, the space S22 between the protrusion 8 and the third sidewall 5C of the depression 5, and the space S23 between the protrusion 8 and the bottom wall 5E of the depression 5.

In the housing 50 according to the embodiment, the part of the cable 1 is housed in the housing area 30 of the cable housing 2 by utilizing the restoring force of the cable 1. Accordingly, the part of the cable 1 can be housed in a stable manner in the housing 50 without increasing the outside dimension.

The cable housing 2 is formed within the housing 50, and has a cable housing space S (see FIG. 4 to FIG. 6) that can house a part of the cable 1, and an opening 200 (see FIG. 7) that opens to the outside of the housing 50 from the cable housing space S.

As shown in FIG. 7, the opening 200 has an upper opening section 200A and a lower opening section 200B, both of which are formed in a substantially horizontal direction, and an intermediate opening section 200C formed from one lateral end (right end) of the upper opening section 200A to one lateral end (right end) of the lower opening section 200B. In the example of FIG. 7, the intermediate opening section 200C is formed in a substantially vertical direction.

An upper edge of the other lateral end (left end) of the upper opening section 200A has a convex shape that is convexed upwards. A lower edge of the other lateral end (left end) of the lower opening section 200B has a convex shape that is convexed downwards.

As shown in FIGS. 8 to 10, the cable 1 inserted from the intermediate opening section 200C is held by the other lateral end (left end) of the upper opening section 200A and the other lateral end (left end) of the lower opening section 200B.

The present invention has been described above in detail by use of the embodiment described above. However, it is obvious to those skilled in the art that the present invention is not limited to the embodiment described in the specification. The present invention can be implemented as corrected and modified aspects without departing from the spirit and scope of the invention to be defined by the description in "What is claimed is." Hence, the description of the specification is for illustrative purposes only, and is not intended to limit the present invention.

What is claimed is:

1. A housing that can house an electronic device therein, comprising:
    a cable housing capable of housing a part of a cable, the cable housing comprising:
        a depression; and
        a protrusion extending out from a part of a first sidewall of the depression towards a fourth sidewall of the depression along a second sidewall, a third sidewall, and a bottom wall of the depression, wherein
    in the cable housing, a part of the cable is housed in a housing area by way of a passing area after being inserted into an insertion area,
    the housing area and the passing area each include a space between the protrusion and the second sidewall, a space between the protrusion and the third sidewall, and a space between the protrusion and the bottom wall,
    the insertion area includes a space between the protrusion and the fourth sidewall, and
    at a boundary portion between the housing area and the passing area, a distance between the second sidewall and the third sidewall in the housing area is longer than a distance between the second sidewall and the third sidewall in the passing area.

2. The housing according to claim 1, further comprising an insertion port into which an end of the cable is inserted.

3. A housing that can house an electronic device therein, comprising:
    a cable housing comprising:
    a cable housing space capable of housing the part of the cable; and
    an opening which opens to outside of the housing from the cable housing space, and which includes:
        an upper opening section and a lower opening section which are formed in a substantially horizontal direction; and
        an intermediate opening section formed from one lateral end of the upper opening section to the same lateral end of the lower opening section, wherein
    an upper edge of other lateral end of the upper opening section has a convex shape that is convexed upwards, and
    a lower edge of other lateral end of the lower opening section has a convex shape that is convexed downwards.

4. The housing according to claim 3, further comprising an insertion port into which an end of the cable is inserted.

5. A cable housing capable of housing a part of a cable which is connectable to electronic device housed in a housing, the cable housing formed within the housing; the cable housing comprising:
    a cable housing space capable of housing the part of the cable;
    an opening which opens to outside of the housing from the cable housing space, and the opening including:
        an upper opening section and a lower opening section which are formed in a substantially horizontal direction; and
        an intermediate opening section formed from one lateral end of the upper opening section to the same lateral end of the lower opening section, wherein
    an upper edge of other lateral end of the upper opening section has a convex shape that is convexed upwards, and
    a lower edge of other lateral end of the lower opening section has a convex shape that is convexed downwards,
    whereby when the part of the cable is housed in the cable housing, the part of the cable is forced against walls of the convex in both the upper opening section and the lower opening section by restoring force of the cable.

* * * * *